United States Patent [19]

White

[11] Patent Number: 5,341,906
[45] Date of Patent: Aug. 30, 1994

[54] CONSTANT CURRENT WIRE CROSSING APPARATUS FOR OVERHEAD ELECTRICALLY OPERATED VEHICLES

[76] Inventor: Paul F. White, 70 Elmwood Rd., Wellesley, Mass. 02181

[21] Appl. No.: 137,304

[22] Filed: Oct. 15, 1993

[51] Int. Cl.⁵ ................................ B60M 1/14
[52] U.S. Cl. ........................ 191/37; 246/252
[58] Field of Search ............... 191/36, 37, 38; 246/220, 252, 253, 254, 419

[56] References Cited

U.S. PATENT DOCUMENTS

| | | | |
|---|---|---|---|
| 1,806,164 | 5/1931 | Holden | 191/37 |
| 2,500,826 | 3/1950 | Hoover | 191/37 |
| 2,515,999 | 7/1950 | Hanna | 191/38 |
| 2,727,102 | 12/1955 | Sawyer | 191/37 |
| 2,794,867 | 6/1957 | Sawyer | 191/37 |
| 2,802,072 | 8/1957 | Matthes | 191/37 |
| 4,301,899 | 11/1981 | McSparran et al. | 191/15 X |
| 5,117,072 | 5/1992 | White | 191/39 |

Primary Examiner—Michael S. Huppert
Assistant Examiner—Scott L. Lowe
Attorney, Agent, or Firm—William Nitkin

[57] ABSTRACT

A constant current wire crossing apparatus for overhead electrically operated vehicles, wherein wires of opposite polarity are connected by insulators to a crossing unit, including a conducting strip disposed on each insulator and appropriate switching circuitry such that a continuous source of power of correct polarity is available to a passing vehicle in any direction.

7 Claims, 2 Drawing Sheets

CONSTANT CURRENT WIRE CROSSING APPARATUS FOR OVERHEAD ELECTRICALLY OPERATED VEHICLES

BACKGROUND OF THE INVENTION

1. Field of the Invention

The invention relates to apparatus employed at the intersection of two wires of opposite polarity in overhead electrically operated vehicle systems and more particularly relates to devices designed to prevent loss of power at such crossings. p 2. Description of the Prior Art:

Electric trolley buses and similar vehicles obtain power from a pair of overhead electrical conducting wires, one positive and the other negative usually at a nominal direct current voltage of 600 volts. When a pair of wires diverges from the main path, a switch is installed which changes the path of the vehicle current collectors. In this switch one of the wires of one polarity must cross the other wire which is at the opposite polarity, To prevent a short circuit, insulators are placed in one of the wires which cross. If the current collectors take the direction through the switch that does not have the insulation, no interruption to current occurs. If the direction through the switch is the one with insulators, an interruption to current occurs and this is usually associated with arcing and burning as the trolley bus loses power. In some instances a trolley bus with insufficient speed can stop under the conventional crossing device, lose power and stall. The same consequences for operation through crossings exists as at switches.

A variety of inventions addressing the difficulties encountered at these junctions are found in the prior art. For example U.S. Pat. Nos. 2,500,826, Hoover, discloses the use of short segments of standard trolley wire as replacement parts for crossovers; U.S. Pat. No. 2,727,102, Sawyer, describes a system for guiding vehicle current collectors past such crossings; and U.S. Pat. No. 2,802,072, Matthes, reveals a novel mechanical crossing assembly.

U.S. Pat. No. 2,794,867 Sawyer, details a crossing device in which power of the correct polarity is applied to the intersection coupling or pan upon the approach of the vehicle. However in this invention no provision is made for the loss of power at the insulators which connect the overhead wires to the crossing unit.

The invention disclosed herein provides a means by which power or current is always available to the vehicle at any point in the crossing. This is accomplished by the addition of an additional conducting strip along a portion of the insulators, means for powering such strips, and an improved switch for supplying power of the correct polarity to the crossing unit.

SUMMARY OF THE INVENTION

The invention may be summarized as a device for supplying constant current or power to vehicle current collectors at crossing points of wires of opposite polarity consisting of a conducting strip added to the overhead wire isolating insulators and appropriate associated circuitry. Diode means are provided in a connecting wire to power such strips with current of the correct polarity and a polarity changing switch employing gate turn off thyristors responsive to contactors positioned in proximity to the insulators is used to instantly set the crossing unit at the correct potential.

Additionally, indicators for signaling the polarity of the crossing unit are provided and a choke coil is employed in the switch to prevent accidental shorting.

The essence of the constant current wire crossing invention is the addition of conducting strips of the proper length to insulators of a standard size which exist in profusion in transit systems presently in operation. These strips are positioned such that as the vehicle current collecting shoe travels toward the crossing unit, power is continuously maintained.

This is accomplished by the collector bridging first the primary wire and the conducting strip and then the conducting strip and the crossing unit. The conducting strip is powered by a connection to the crossing unit through a diode oriented to allow only power of the correct polarity to reach the conducting strip. As the vehicle moves past the crossing point, the order of contact is reversed through conducting strips on insulators on the opposite side. As the device is symmetrical it can accommodate the passage of vehicles from either direction.

The invention, by providing constant current at a wire crossing alleviates the problems of power loss resulting in disabled vehicles and arcing and burning of contacts from power surges all of which are well known in the industry.

The features and advantages of the invention will be more fully understood from the description of the preferred embodiment taken with the drawings which follows.

DESCRIPTION OF THE PREFERRED EMBODIMENT

Figure 1:
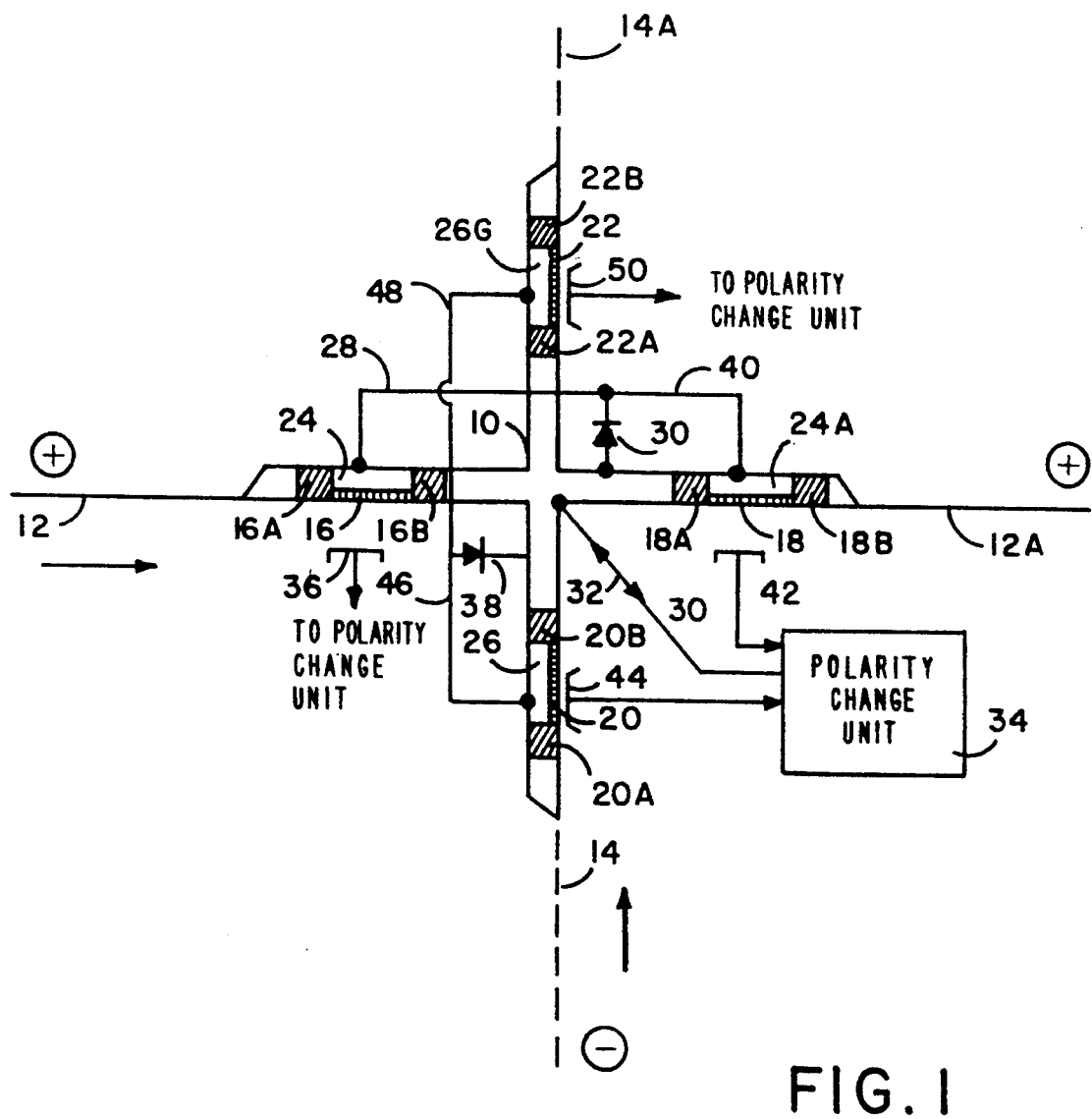
FIG. 1 is a schematic illustration of the preferred embodiment of the invention.

Referring to FIG. 1 there is shown in diagrammatic format the preferred embodiment of the invention applied to an intersection or crossing of a pair of electrical wires of opposite polarity as would be found in an overhead electrically operated vehicle system, for example a bus or trolley railway.

As illustrated, the equipment consists of a crossing unit or pan 10, a pair of positive wires 12 and 12a and a pair of negative wires 14 and 14a, Each of the wires is attached to crossing unit 10 by an insulating runner 16 and 18; and 20 and 22 respectively. Each insulating runner has disposed thereon a conducting strip, of lesser length than the runner, 24 and 24a and 26 and 26a respectively. The conducting strips are electrically connected to the crossing unit in a manner which will be discussed in detail below. The operation and function of the various components described in terms of the passage of a vehicle current collecting shoe are as follows:

Travel on the Positive Wire

As the vehicle current collecting shoe passes from the positive wire 12 onto insulator portion 16a; current is received from positive wire 12. The shoe continues travel until it passes onto conducting strip 24, It now makes contact with both positive wire 12 and conducting strip 24 and it bridges insulating piece 16a. Current is received from wire 12 and strip 24 through connection 28, diode 30, crossing unit connection 32, and polarity change switch 34.

The insulating pieces 16a,b; 18a,b; 20a,b; and 22a,b are of such length that they are slightly shorter than the carbon insert of the vehicle current collecting shoe so that the shoe will bridge the length of each insulating piece. This insures that the carbon of the shoe will always have some portion of it on an energized conducting surface.

As the shoe passes onto conducting strip 24, it makes contact with contactor strip 36, actuating the negative turn off/positive turn on circuit of polarity change switch 34 making crossing unit 10 go to a positive polarity. As the shoe travels further, it leaves positive wire 12 and passes completely onto conducting strip 24, where it receives current through connection 28, diode 30, and crossing unit 10 through connection 32 from polarity change switch 34.

The shoe travels from conducting strip 24 onto insulated piece 16b and further onto crossing unit 10. The shoe bridges insulating piece 16b and receives current from conducting strip 24, connection 28, diode 30, and crossing unit 10 through connection 32 and polarity change switch 34. When the shoe made contact with positive wire 12 and contactor strip 36, the polarity change switch 34 turned to positive polarity putting 600 volt direct current potential on crossing unit 10. Diode 38 prevents current from flowing out of crossing unit 10 to connections 46 and 48 and conducting strips 26 and. 26a.

The shoe travels from crossing unit 10 onto insulating piece 18a and conducting strip 24a. Insulating piece 18a is bridged by the shoe so that the current flows from unit 10, to diode 30 through connection 40 to conducting strip 24a. Current is supplied by polarity change switch 34 to connection 32 to crossing unit 10.

The shoe travels completely onto conducting strip 24a and makes contact with contactor strip 42 actuating the polarity change switch positive polarity circuit. Since it has been actuated as the shoe passed through contactor strip 36, this action is inconsequential but the symmetrical design of the unit allows for travel in both directions.

The shoe travels from conducting strip 24a onto insulating piece 18b and positive wire 12a, The shoe bridges insulating piece 18b and receives current from positive wire 12a and conducting strip 24a through connection 40, diode 30, crossing unit 10, and connection 32 from polarity change switch 34.

As the shoe leaves the crossing unit and passes onto positive wire 12a crossing unit 10 remains in the positive polarity and will remain so until a current collecting shoe traveling on the negative wire causes it to change polarity.

Travel on the Negative Wire

As the current collecting shoe passes from the negative wire 14 onto insulator 20 current is returned to negative wire 14. The shoe continues travel until it passes onto conducting strip 26. It now makes contact with negative wire 14 and conducting strip 26 and it bridges insulating piece 20a.

As the shoe passes onto conducting piece 26, it makes contact with contactor strip 44, actuating the positive turn off/negative turn on circuit of polarity change switch 34 making crossing unit 10 go to a negative polarity. As the shoe travels further, it leaves negative wire 14 and passes completely onto conducting strip 26 where it returns current through connection 46 to diode 38, to crossing unit 10, through connection 32 to polarity change switch 34.

The shoe travels from conducting strip 26 onto insulated piece 20b and crossing unit 10. The shoe bridges insulating piece 20b and returns current to conducting strip 26, connection 18 to diode 38 to crossing unit 10, to connection 32 to polarity change switch 34, When the shoe made contact with negative wire 14 and contactor strip 44, the drive unit turned off the positive polarity and turned on negative polarity for the crossing unit 10. Diode 30 prevents current from flowing from connection 28 and 40 and conducting strips 24 and 24a to the crossing unit 10.

The shoe travels from crossing unit 10 onto insulating piece 22a and conducting strip 26a. Insulating piece 22a is bridged by the shoe so that current returns to crossing unit 10 and from connection 48 to diode 38 to crossing unit 10. Current returns to the polarity change unit 34 through connection 32.

The shoe travels completely onto conducting strip 26a and makes contact with contactor strip 50 actuating the polarity change switch's negative polarity circuit. Since it has been activated as the shoe passed through contactor strip 44, this action is inconsequential but provides for travel in both directions.

The shoe travels from conducting strip 26a onto insulating piece 22b and negative wire 14a. The shoe bridges insulating piece 22b and returns current to negative wire 14a and polarity change switch 34 through connection 48, diode 38, crossing unit, and connection 32 to the polarity change unit.

As the shoe leaves the crossing unit and passes onto negative wire 14a, the crossing unit remains in the negative polarity and will remain so until a current collecting shoe on the positive wire causes it to change polarity.

Operation of Polarity Change Unit

Figure 2:
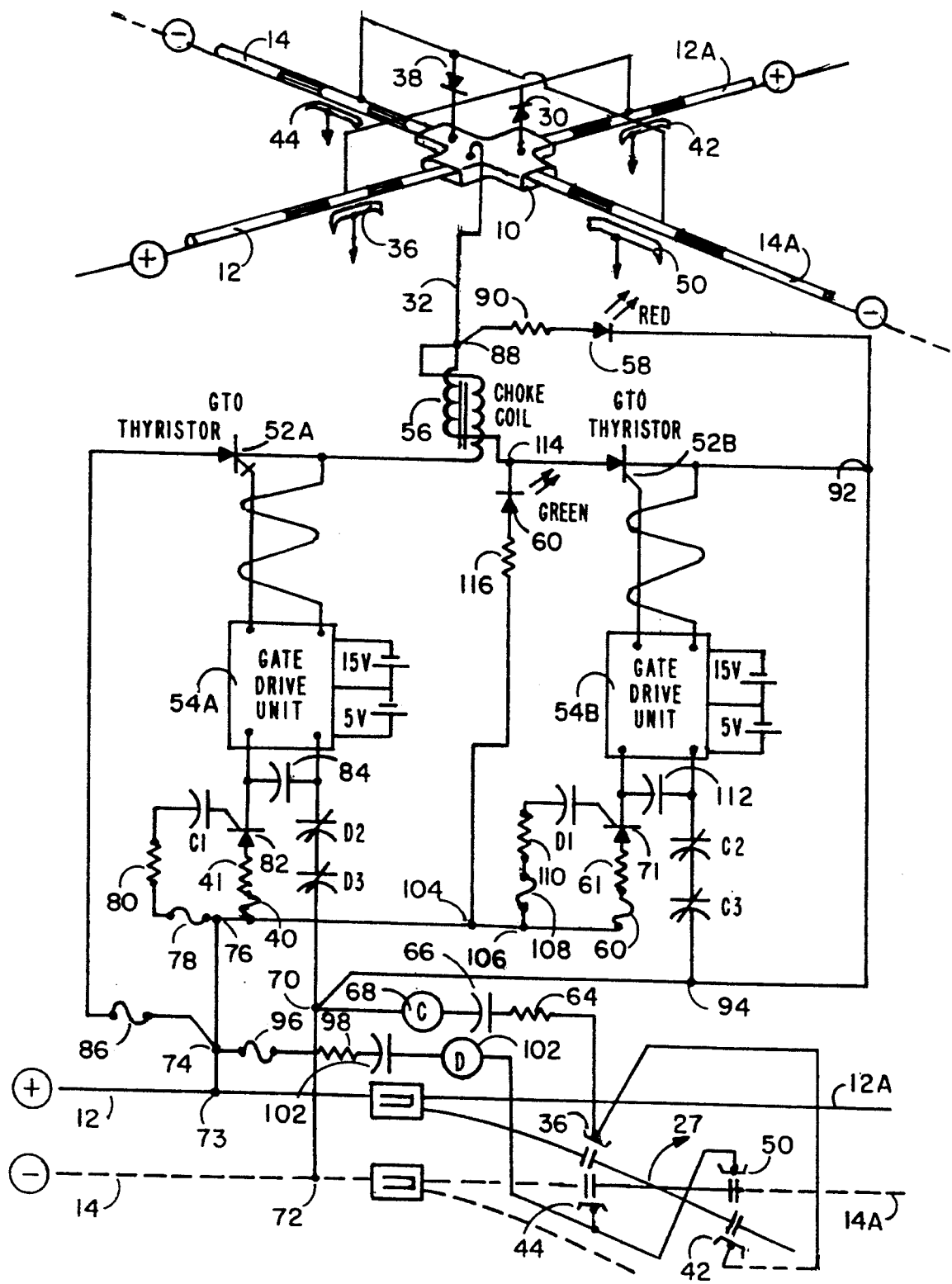
FIG. 2 is an electrical schematic of one component of the device of FIG. 1.

Referring to FIG. 2, the polarity change switch 34 illustrated changes the polarity of the crossing unit from negative to positive and positive to negative as a current collector shoe bridges the respective contacts 36, 42, 44 or 50. Unit 34 consists of two gate turn off (GTO) thyristors, 52a, 52b each controlled by a gate drive unit 54a, 54b which is a commercially available device designed to control GTO thyristors. One GTO thyristor makes the crossing device positive and the other GTO thyristor makes it negative. The GTO thyristors are in conduction mode or turned on only when the gate drive unit is receiving a positive current from a voltage of 5 volts DC. When there is no voltage for operation of the gate drive unit, it turns off. Each gate drive unit is controlled by a silicon control rectifier (SCR) and two normally closed contacts of a relay controlled by operation of the opposite polarity gate drive unlit control. The respective SCR's are turned on by contacts 36, 42, 44 and 50 previously described. The cathode end of the positive GTO thyristor and the anode end of the negative GTO thyristor are wired in opposite turns on choke coil 56 which is connected to crossing unit 10. The choke coil prevents a short circuit should both thyristors be turned on simultaneously. A main fuse on the positive connection also protects against short circuit.

Two light emitting diodes one red 58 for positive and the other green 60 for negative give an indication as to which polarity the crossing piece is in.

When a vehicle shoe bridges contact 36 with positive wire 12, current flows through wire 62, through resistor 64, capacitor 66, C relay coil 68 to connection 70, to connection 72 at the negative wire. As the current flows, capacitor 66 charges up, C relay coil 68 is energized until capacitor 66 is fully charged, at which point current ceases to flow. Capacitor 66 is used to protect coil 68 from overheating should the current collector shoe stop on contact 36. As the current flows through relay coil 68 and energizes it, the relay operates and normally closed contacts C2 and C3 open while normally open contact C1 closes. This happens simultaneously. The action of contacts C2 and C3 opening causes a cessation of current flow for gate drive unit 54b so that it turns off. The cessation of current also causes silicon control rectifier 71 to turn off.

As the gate drive unit 54b, turns off, gate drive unit 54a turns on. This is accomplished by the closure of contact C1. Closure of this contact allows current to flow from the positive wire at connection 73 to 74 to 76, through fuse 78, resistor 80, and contact C1 to the gate of SCR 82. A gate trigger voltage of 5 volts turns on the SCR and current flows through capacitor 84, normally closed contacts D2 and D3 of relay D, through connection 70 and 72 to the negative wire 14. Current flows as the capacitor is charging. A positive voltage potential of 5 volts allows the gate drive unit 54a to turn on allowing current to flow through this device and through normally closed contacts D2 and D3, through connection 70 and 72 to the negative contact wire. At this time, the capacitor is fully charged and current ceases to flow through it. Gate drive unit 54a is turned on driving thyristor 52a. Gate drive unit 34b is turned off and thyristor 52b is not driven but is turned off so that no current can flow through it.

With thyristor 52a turned on, positive current flows from the positive wire 12 through contact 73, 74, fuse 86 to thyristor 52a, through it and to the choke coil 56. Current flows through the choke coil, through connection 88 to the crossing unit. The device is now at 600 volts potential. When connection 88 is at 600 volts potential, current flows from it, through resistor 90, light emitting diode 58 connections 92, 94, 70, 72 to the negative wire. This causes LED 58 to glow red giving indication that the crossing unit is in the positive polarity mode. The crossing unit remains in this polarity mode until a vehicle current collector shoe passes through the device on the negative wire.

When a shoe on the negative wire bridges contact 44 with negative wire 14, current flows from the positive wire through connection 73, 74, through fuse 96, resistor 98, capacitor 100, relay coil 102 to contact 44 and to the negative wire 14. As the current flows, capacitor 100 is charged up and as it is charging D relay coil 103 is energized until capacitor 100 is fully charged at which point current ceases to flow. Capacitor 100 is used to keep D relay coil 102 from overheating in the event a current collector shoe stops on contact 44. As the current flows through D relay coil 102 and energizes its the relay operates and normally closed contacts D2 and D3 open while normally open contact D1 closes. This happens simultaneously. The action of contacts D2 and D3 opening causes a cessation of current flow for gate drive unit 54a so that it turns off. The cessation of current also causes silicon control rectifier 82 to turn off.

As gate drive unit 54a turns off, gate drive unit 54b turns on. This is accomplished by the closure of contact D1. Closure of this contact allows current to flow from the positive wire 12 to connection 73, through 74, 76, through connection 104 to 106, through fuse 108, resistor 110, contact D1, to the gate drive of SCR 71. A gate trigger voltage of 5 volts turns on SCR 71 and current flows through capacitor 112, normally closed contacts C2 and C3, through connection 94, connection 70 and 72 to the negative wire 14. Current flows as the capacitor is charging. A positive voltage potential of 5 volts allows the gate drive unit 54b to turn on allowing current to flow through this device and through normally closed contacts C2 and C3, through connection 94, 70, 72 to the negative wire 14. At this time the capacitor 112 is fully charged and current ceases to flow through it. Gate drive unit 54b is turned on and drives thyristor 52b. Gate drive unit 54a is turned off and thyristor 52a is turned off so that no current can flow through it.

With thyristor 52b turned on, negative current flows from the crossing unit 10 through connection 32, through choke coil 56, through connection 114 through thyristor 52b to connection 92, to connections 94, 71, 72, to negative wire 14. With thyristor 52b turned on, light emitting diode 60 glows as current flows from the positive wire to connection 73, to connection 74, to 76, to 104, through resistor 116, through LED 60 to connection 114, through thyristor 52b to connection 92, to connection 94 to 70, 72, and to negative wire 14. LED 60 glows green giving indication that the crossing unit 10 is in the negative polarity mode. The crossing device remains in this polarity mode until a current collector shoe passes through the device on the positive wire.

Figure 3:
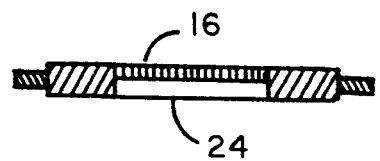
FIG. 3 is an elevation view of an additional component of the device of FIG. 1.

FIG. 3 is an elevational view of one of the insulators 16 and conducting strip 24 discussed above illustrating the physical construction of the unit.

As variations in the above described embodiment will now be apparent to those skilled in the art, the scope of the invention is defined by the following claims.

What is claimed is:

1. In an overhead electrically operated vehicle system having crossing points of electrical wires of opposite polarity wherein said wires are separated from each other by a crossing unit and an insulator disposed between each of said wires and said unit, said vehicle having a current collector for withdrawing power from said wires, the improvement which comprises:

conducting strips attached to each of said insulators, respectively, and positioned to communicate with said current collector on passage of said vehicle and of a length sufficient to allow successive simultaneous contact first by said collector with said wires and said strips and then with said strips and said crossing unit.

2. The apparatus of claim 1 wherein said strips are positioned equidistant from each end of each of said insulators, respectively.

3. A crossing apparatus for an overhead electrically operated vehicle system having crossing points of electrical wires of opposite polarity, said vehicle having a current collector for withdrawing power from said wires, said apparatus adapted to provide constant current to said vehicle upon traversing said crossing in any direction, said apparatus comprising in combination:

a. four armed crossing unit comprising an intersecting pair of current conducting members;

b. an elongated insulator attached to each of said arms and each of said wires;

c. a conducting strip attached to each of said insulators positioned to communicate with said current collector on passage of said vehicle and of a length sufficient to allow successive simultaneous contact first by said collector with said wires and said conducting strips and then with said conducting strips and said crossing unit, each of said conducting strips electrically connected to said crossing unit;

d. polarity change switch means for selectively providing electrical power of positive or negative polarity to said crossing unit;

e. a contactor strip positioned in close proximity to each of said crossing unit arms, said contactor strips connected to said switch means and adapted to communicate with said current collector on passage of said vehicle to place said crossing unit in a condition of appropriate polarity; and f. diode means interposed between each of said conducting strips and said crossing unit to prevent transfer of power of opposite polarity to said conducting strips.

4. The apparatus of claim 3 wherein said polarity change switch means comprises:

a pair of gate turn off thyristors one each interposed between each of said wires of opposite polarity and said crossing unit;

b. a pair of gate drive units one for actuating each of said thyristors;

c. pair of silicon control rectifiers, one each for activating each of said gate drive units; and d. a pair of relays, one each for activating each of said silicon control rectifiers, said relays connected to said contactor strips of appropriate polarity for activation by said current collector upon passage of said vehicle.

5. The apparatus of claim 4 wherein said polarity change switch means further includes indicator means for signaling the polarity of the crossing unit.

6. The apparatus of claim 5 wherein said indicator means comprise light emitting diodes.

7. The apparatus of claim 5 further including a choke coil interposed between said thyristors and said crossing unit to prevent shorting upon accidental simultaneous energization of both of said thyristors.

* * * * *